(12) United States Patent
Goyal et al.

(10) Patent No.: US 8,270,967 B1
(45) Date of Patent: Sep. 18, 2012

(54) OVERRIDING A MOST-RECENTLY-USED (MRU) TABLE FOR SYSTEM ACQUISITION

(75) Inventors: Anoop K. Goyal, Overland Park, KS (US); Bhagwan Khanka, Lenexa, KS (US); John W. Prock, Peculiar, MO (US)

(73) Assignee: Sprint Spectrum, L.P., Overland Park, KS (US)

( * ) Notice: Subject to any disclaimer, the term of this patent is extended or adjusted under 35 U.S.C. 154(b) by 299 days.

(21) Appl. No.: 12/702,763

(22) Filed: Feb. 9, 2010

(51) Int. Cl.
*H04W 4/00* (2009.01)

(52) U.S. Cl. .................. 455/432.1; 455/432.3; 455/434; 455/435.2; 455/435.3

(58) Field of Classification Search ............... 455/432.1, 455/434, 435.2, 435.3, 432.3
See application file for complete search history.

(56) References Cited

U.S. PATENT DOCUMENTS

| | | | |
|---|---|---|---|
| 6,415,148 B1 | 7/2002 | Chiniga et al. | |
| 7,340,212 B2 | 3/2008 | Kamdar et al. | |
| 2004/0192328 A1* | 9/2004 | Giacalone et al. | 455/455 |
| 2007/0197211 A1* | 8/2007 | Lee et al. | 455/432.1 |
| 2007/0275719 A1 | 11/2007 | Lee et al. | |
| 2008/0102825 A1* | 5/2008 | Joo | 455/432.1 |
| 2009/0059845 A1* | 3/2009 | Cooper et al. | 370/328 |
| 2009/0075650 A1* | 3/2009 | Jung | 455/432.3 |
| 2010/0046385 A1* | 2/2010 | Kamei et al. | 370/252 |
| 2010/0075669 A1* | 3/2010 | Sparks et al. | 455/433 |
| 2010/0075671 A1* | 3/2010 | Kubo | 455/434 |
| 2010/0291924 A1* | 11/2010 | Antrim et al. | 455/433 |
| 2011/0003590 A1* | 1/2011 | Yoon et al. | 455/432.1 |

FOREIGN PATENT DOCUMENTS

WO  WO 2008027660  3/2008

* cited by examiner

*Primary Examiner* — Jinsong Hu
*Assistant Examiner* — Qun Shen

(57) ABSTRACT

Methods and systems are provided for overriding a most-recently-used (MRU) table for system acquisition. In an embodiment, a mobile station maintains an MRU table populated with data identifying one or more networks to which the mobile station was most recently connected, and the mobile station is arranged to conduct system acquisition by referencing the MRU table prior to referencing a preferred roaming list (PRL). The mobile station receives an MRU-override instruction from a wireless network, and modifies its MRU table according to the instruction, producing a modified MRU table, and conducts at least one subsequent system acquisition with reference to the modified MRU table.

23 Claims, 3 Drawing Sheets

OVERRIDING A MOST-RECENTLY-USED (MRU) TABLE FOR SYSTEM ACQUISITION

BACKGROUND

Many people use mobile stations (e.g. cell phones and personal digital assistants (PDAs)) to communicate with cellular wireless networks, which provide communication services such as voice, text messaging, and packet-data communication. These mobile stations and networks typically communicate with each other over a radio frequency (RF) air interface according to one or more wireless protocols (e.g. CDMA (Code Division Multiple Access), EV-DO (Evolution Data Optimized), etc.). Mobile stations typically conduct communications with these networks via one or more base transceiver stations (BTSs), which send communications to and receive communications from mobile stations over the air interface.

Each BTS is typically connected with a network entity known as a base station controller (BSC), which controls one or more BTSs and acts as a conduit with one or more switches or gateways, such as a mobile switching center (MSC) and/or a packet data serving node (PDSN), which may then interface with one or more signaling and/or transport networks. As examples, an MSC may interface with the public switched telephone network (PSTN), while a PDSN may interface with one or more core data networks and/or the Internet. As such, mobile stations can typically communicate over the one or more signaling and/or transport networks from anywhere inside the coverage area of one or more BTSs, via the BTS(s), a BSC, and a switch or gateway.

Mobile stations and base stations (i.e. BTSs or BTS/BSC combinations) conduct these communications over frequencies known as carriers, each of which may actually be a pair of frequencies, with the base station transmitting to the mobile station on one frequency (i.e. the forward link), and the mobile station transmitting to the base station on the other (i.e. the reverse link). This is known as frequency division duplex, and an instance of a carrier in a coverage area referred to as a sector may be known and referred to herein as a sector-carrier.

OVERVIEW

When a mobile station is powered on, reset, or brought into a coverage area such as a cell or a sector of a cellular wireless network, or experiences one or more other triggers, the mobile station typically undertakes a process known in the art as system acquisition, during which the mobile station scans the airwaves for networks to which it can connect and receive service—that is, the mobile station attempts to acquire a system or network. In CDMA networks for example, system acquisition involves trying to detect broadcast codes referred to as System Identification Codes (SIDs) and Network Identification Codes (NIDs). As is known in the art, system acquisition often involves the mobile station making use of a stored data table known as a preferred roaming list (PRL), which is typically organized by geographic region, and typically lists a large number of networks to which the mobile station can connect, along with indications that some networks are preferred relative to others.

When carrying out system acquisition, many mobile stations utilize a mechanism known as and referred to herein as a most-recently-used (MRU) table, which is a data table that is stored by the mobile station and typically includes one or more data values associated with at most a particular number of the networks with which the mobile station was most recently connected. In a typical arrangement, for each network listed therein, the MRU table includes data values known as the mode, band, and channel. The mode indicates the type of wireless-communication technology according to which the mobile station was communicating with the network, where example modes include CDMA, EV-DO, AMPS, WiMax, etc. The band indicates in what range of physical frequency the mobile station was communicating with the network, where example bands include cellular, PCS, etc. as is known in the art. The channel indicates the actual physical frequency (i.e. carrier) on which the mobile station was communicating with the network.

Typically, the MRU table is sorted such that the network with which the mobile station was communicating most recently is listed first, at a designation often used and referred to herein as MRU[0]. The next entry (MRU[1]) would be the network with which the mobile station was communicating second-most recently, and so on, up to the last entry in the MRU table, which is referred to herein as MRU[n−1]. An MRU table having this arrangement could thus store data identifying up to the n networks with which the mobile station was most recently connected, where typical values for n are on the order of 10-15. And other arrangements are possible.

In operation, then, upon beginning system acquisition, a mobile station arranged to use an MRU table would typically start at MRU[0], scan for that network, and connect to it if it is available. If the mobile station does not successfully connect to the MRU[0] network, the mobile station would typically then proceed sequentially to MRU[1], and perhaps all the way to MRU[n−1], each time trying to connect with the respective network, stopping if successful, and proceeding if not. When shutting down, a typical mobile station will store the MRU table—or at least a portion thereof—in what is known as non-volatile memory, such that that stored data will be available to the mobile station on power-up. In general, the purpose of using the MRU-table mechanism is to expedite the process of system acquisition.

In current implementations, mobile stations carry out the above-described MRU-table portion of system acquisition and then, if still unable to successfully connect to a network, proceed to using the PRL as the next guide to identifying and connecting to a network. If and when the mobile station connects to a network, even a roaming network, that network will then take the top spot (i.e. MRU[0]) in the MRU table, and be the first network to which the mobile station attempts to connect the next time. This is not desirable for at least the reason that rates for roaming on particular networks may be higher than for roaming on other networks, both obviously being higher than not roaming at all. Another reason that this is not desirable is that certain services and features may only be available to the mobile station on the mobile station's home network (i.e. that of its service provider). And there are other reasons.

Thus, it can be appreciated from the above explanation that, in current implementations, the MRU table is quite influential in determining the network with which a mobile station will connect during system acquisition. As can also be appreciated, it is not always the case that the MRU table—and MRU[0] in particular—contains data that will guide the mobile station towards connecting to (and thereafter communicating via) the best network for that mobile station.

In accordance with the presently described methods and systems, a wireless service provider uses an MRU-override instruction, which may take the form of or include a location-specific list of networks, referred to herein as the MRU-override list, to override a mobile station's MRU table, such that the mobile station will, when next undergoing system acquisition, use a modified or replacement MRU table as its initial guide to finding a network with which to connect. The networks listed in the MRU-override list may be selected based on the location (e.g. cell, sector, geographic location, etc.) of the mobile station.

The use of an MRU-override list overrides the MRU table and directs the mobile station to a preferred network—or to one of a set of preferred networks—listed in the MRU-override list. The MRU-override list may be different in different coverage areas (i.e. cells and sectors) and more generally in different locations of the service provider's network, configurable as such by the service provider. The service provider may, perhaps periodically, push (i.e. broadcast) a given MRU-override instruction (e.g. MRU-override list) in a given coverage area, perhaps as part of a system parameters message, perhaps as part of another message, or perhaps as its own message, similar to the way neighbor lists are currently deployed.

A mobile station may be arranged to receive the MRU-override instruction(s), store it each time it receives it, and use the last-received MRU-override instruction to replace or modify the mobile station's MRU table prior to next undergoing system acquisition. That is, if the mobile station replaces or modifies its MRU table in accordance with the instruction, the mobile station will use that replacement or modified table when next undergoing system acquisition.

In an embodiment, the MRU-override instruction comprises an MRU-override list that completely replaces a mobile station's MRU table, such that the mobile station would then use the MRU-override list in the MRU stage of system acquisition. In an embodiment, the MRU-override instruction comprises an MRU-override list that partially changes a mobile station's MRU table (e.g. replacing the first two entries), such that the mobile station would then use a modified MRU table for system acquisition. And other examples are possible as well.

In an embodiment, the MRU-override instruction takes the form of an instruction that a mobile station should change the order of its MRU table prior to proceeding with the MRU stage of system acquisition. This change could be reversing the order, or perhaps deleting one or more entries from the top of the list and then promoting lower entries up to the top. And certainly other instructed changes to the MRU table are possible as well. In some embodiments, the MRU-override instruction does not include reference to any particular networks.

In some embodiments, a mobile station conditions obeying the MRU-override instruction on one or more criteria, which may be included in the MRU-override instruction itself, or may be otherwise communicated by the network to the mobile station, or may already be programmed (e.g. provisioned) into the operating logic of the mobile station, or perhaps some combination of these options. One possible criterion is that the mobile station's location is within a particular range (e.g. longitude range and latitude range). Another is that the mobile station is less than (or more than) a particular distance from some landmark, such as the location of the base station, or perhaps some other landmark. Another is that a given number (e.g. 1 or 2) (perhaps having to be at the top) of spots in the mobile station's current MRU table are occupied by roaming networks. And certainly one or more other criteria may be used as well in given implementations.

In some embodiments, the network (e.g. the base stations) is arranged to broadcast an instruction that mobile stations use their existing MRU tables (i.e. a "status-quo instruction"). The base stations and/or one or more other network entities may determine whether to broadcast a status-quo instruction based on time of day, day of week, air-interface quality, current roaming rates of nearby roaming networks, and/or any other factor(s). In an embodiment, the network sets the order of an MRU-override list included in the MRU-override instruction based on the current roaming rate of at least one nearby roaming network.

And it should be noted that the above overview is illustrative and not limiting. That is, additional and/or different features may be present in some embodiments. It should be noted as well that any description of a mobile station or a cellular wireless network operating according to any particular protocol such as 1xRTT CDMA is by way of example, and that any suitable protocol(s) may be used instead, such as EV-DO, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other protocol now known or later developed.

BRIEF DESCRIPTION OF THE DRAWINGS

Various embodiments are described herein with reference to the following drawings, wherein like numerals denote like entities.

DETAILED DESCRIPTION OF THE DRAWINGS

1. Architecture a. Communication System

Figure 1:
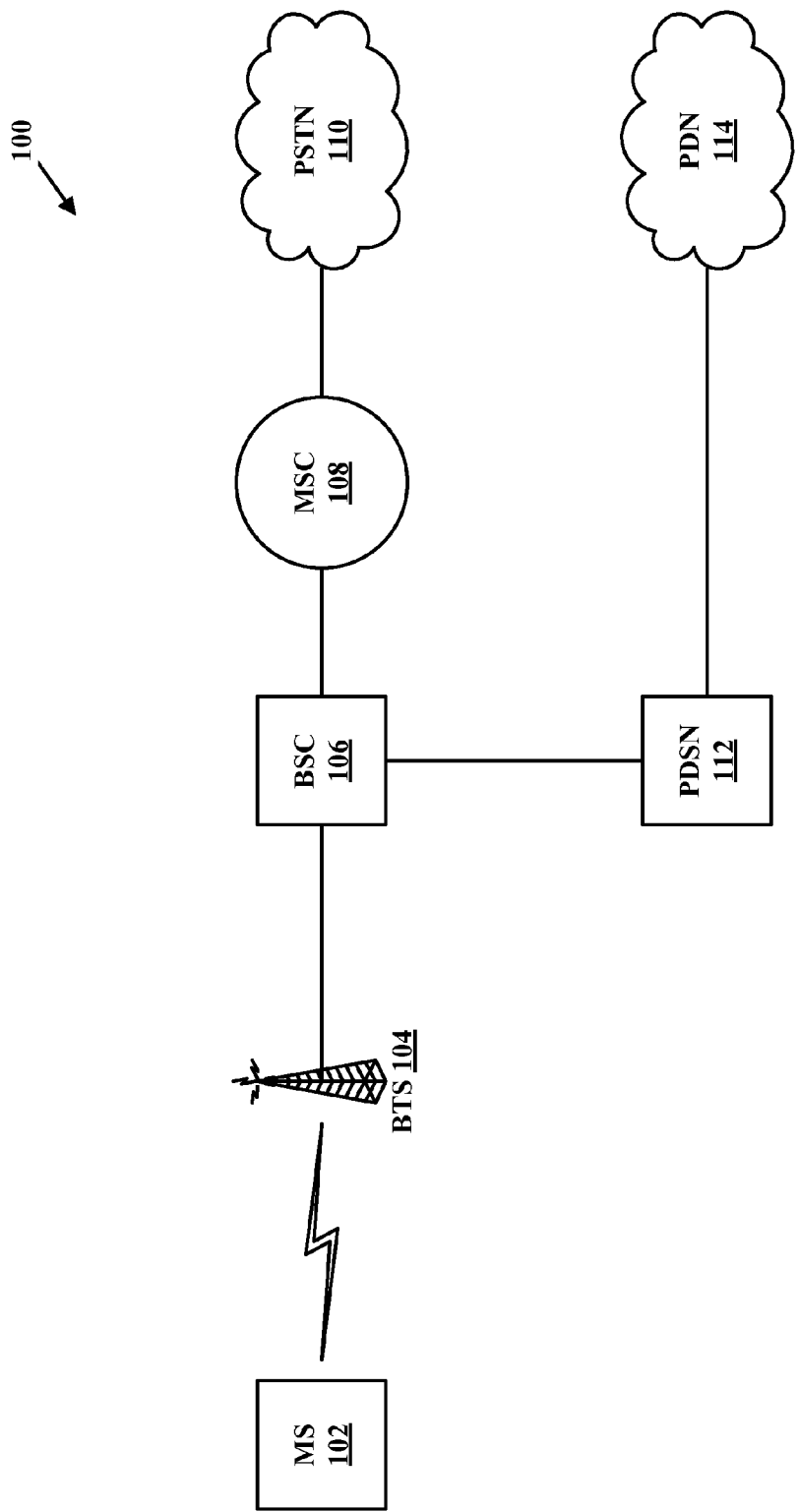
FIG. 1 depicts a communication system, in accordance with an embodiment.

FIG. 1 is a simplified block diagram of a communication system, in accordance with an embodiment. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station 102, a BTS 104, a BSC 106, an MSC 108, a PSTN 110, a PDSN 112, and a packet-data network (PDN) 114.

And additional entities could be present, such as additional mobile stations in communication with BTS 104, additional BTSs in communication with BSC 106, additional BSCs in communication with MSC 108, etc.; and there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

Mobile station 102 may be any mobile device arranged to carry out the mobile-station functions described herein, and is further described in connection with FIG. 2.

BTS 104 may be any network element arranged to carry out the BTS functions described herein, and may include a communication interface, a processor, and data storage containing instructions executable by the processor to carry out those BTS functions. The communication interface may include one or more antennas, chip sets, and/or other components for providing one or more coverage areas such as cells and sectors, for communicating with mobile stations, such as mobile station 102, over an air interface. The communication interface may include one or more wired (e.g. Ethernet) and/or wireless interfaces for communicating with at least BSC 106.

BSC 106 may be any network element arranged to carry out the BSC functions described herein, and may include a communication interface, a processor, and data storage containing instructions executable by the processor to carry out those BSC functions. The communication interface may include one or more wired and/or wireless interfaces for communicating with at least BTS 104, MSC 108, and PDSN 112. In general, BSC 106 functions to control one or more BTSs, and to provide one or more BTSs with connections to devices such as MSCs and PDSNs.

Note that the combination of a BTS and a BSC may be considered—and referred to herein as—a base station. However, a BTS or a BSC could, taken alone, be considered a base station as well. Furthermore, a base station may be considered to be either or both of those devices, and perhaps make use of one or more functions provided by one or more other entities. MSC 108 may be any networking element arranged to carry out the MSC functions described herein, and may include a communication interface, a processor, and data storage containing instructions executable by the processor to carry out those MSC functions. The communication interface may include one or more wired and/or wireless interfaces for communicating with at least BSC 106 and PSTN 110. In general, MSC 108 functions as a switching element between the PSTN and one or more BSCs, facilitating communication between mobile stations and the PSTN.

PDSN 112 may be any networking element arranged to carry out the PDSN functions described herein, and may include a communication interface, a processor, and data storage containing instructions executable by the processor for carrying out those PDSN functions. The communication interface may include one or more wired and/or wireless interfaces for communicating with at least BSC 106 and PDN 114. In general, PDSN 112 functions as a network access server between PDN 114 and one or more BSCs, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol, and may be identified by an address such as an IP address.

b. Mobile Station

Figure 2:
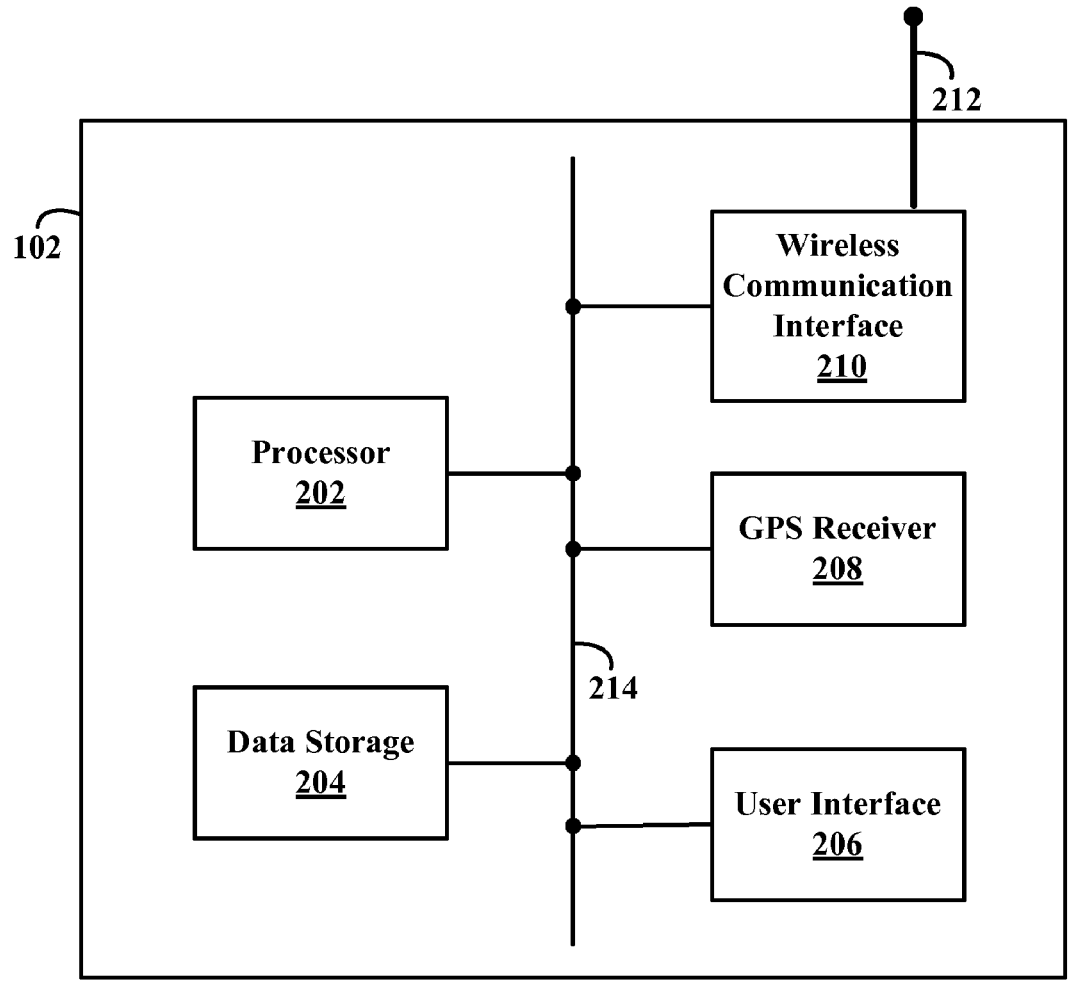
FIG. 2 depicts a mobile station, in accordance with an embodiment.

FIG. 2 is a simplified block diagram of a mobile station that may be used in accordance with an embodiment. As illustrated, mobile station 102 may include a processor 202, data storage 204, a user interface 206, a global positioning system (GPS) receiver 208, and a wireless communication interface 210, all coupled together by a system bus 214. Further, mobile station 102 may include any other mechanisms now known or later developed for such devices.

Processor 202 may include one or more (e.g. parallel) general purpose microprocessor(s) and/or discrete signal processor(s). Data storage 204 may store a set of machine-language instructions executable by processor 202 to carry out various functions described herein. Alternatively, some or all of the functions could instead be implemented through firmware and/or hardware. In addition, data storage 204 may store various data to facilitate carrying out various functions described herein. In addition, data storage 204 may hold user-interface data, among many other possibilities.

User interface 206 may function to facilitate interaction with a user of the mobile station, and include a display, a speaker, a microphone, a key input, a touch-screen, and/or any other elements for receiving inputs and communicating outputs. GPS receiver 208 may be any known or hereafter-developed GPS receiver, suitable for receiving and decoding GPS signals for location and timing purposes, perhaps among other purposes; in some embodiments, mobile station 102 may not have a location module such as GPS receiver 208, or may have location-determination technology that takes another form.

Wireless communication interface 210 may include a chipset suitable for communicating with one or more devices (e.g. base stations) via antenna 212; the chipset could be suitable for CDMA communication, though the chipset or wireless-communication interface 210 in general may also or instead be able to communicate with other types of networks and devices, such as EV-DO networks, Wi-Fi networks, Bluetooth devices, and/or one or more additional types.

2. Operation

Figure 3:
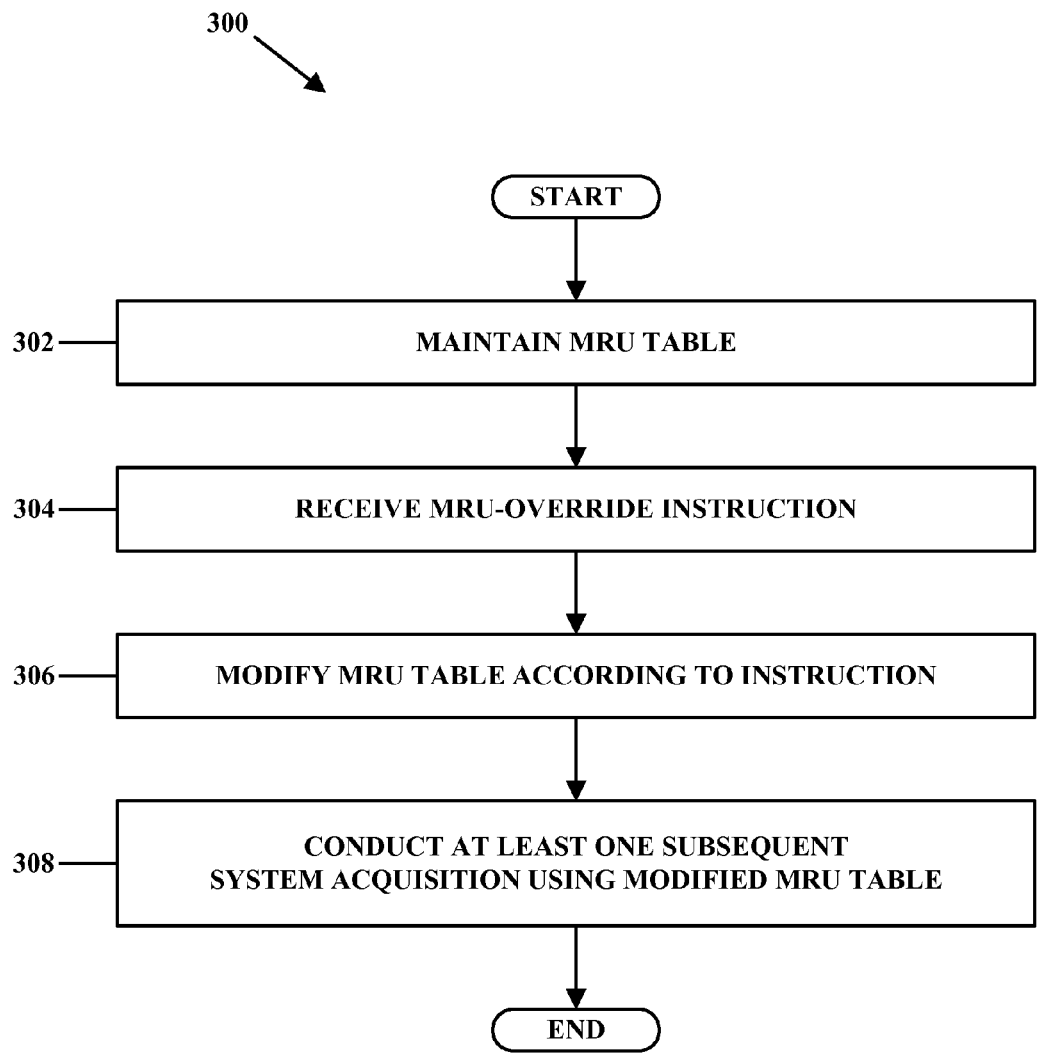
FIG. 3 is a flowchart of a method, in accordance with an embodiment.

FIG. 3 depicts a flowchart of a method, in accordance with an embodiment. As shown in FIG. 3, method 300 begins at step 302 with mobile station 102 maintaining an MRU table that, as described herein, is populated with data identifying one or more networks to which mobile station 102 was most recently connected. Note that mobile station 102 is arranged as described herein to conduct system acquisition by referencing the MRU table prior to its PRL.

At step 304, mobile station 102 receives an MRU-override instruction from a wireless network (e.g. from BTS 104), which may periodically broadcast the MRU-override instruction in a coverage area (such as a cell or a sector), perhaps in a system parameters message. In an embodiment, the MRU-override instruction includes content selected based on at least one of a location of mobile station 102 and a location of a base station.

At step 306, mobile station 102 modifies its MRU table according to the MRU-override instruction, producing a modified MRU table. The MRU-override instruction may include an MRU-override list of at least one network, and mobile station 102 modifying its MRU table according to the MRU-override instruction may involve the mobile station at least partially replacing its MRU table with at least part of the MRU-override list. In an embodiment, mobile station 102 replaces a set number (such as 1 or 2) of entries in—perhaps at the top of—its MRU table with the at least part of the MRU-override list. In an embodiment, the content and/or order of the MRU-override list is determined based on a current roaming rate of at least one network, perhaps directing mobile stations to options less expensive for the carrier and/or customer.

In an embodiment, mobile station 102 modifying its MRU table according to the MRU-override instruction involves mobile station 102 changing the order (e.g. reversing the order) its MRU table. In an embodiment, mobile station 102 modifying its MRU table according to the MRU-override instruction involves mobile station 102 deleting one or more entries from the top of the MRU table list, and promoting lower entries. In some embodiments, the MRU-override instruction does not include a list of one or more networks.

In an embodiment, mobile station 102 conditions the modification of its MRU table according to the MRU-override instruction on one or more criteria being met, where the one or more criteria could be included in the MRU-override instruction, and more generally may be received by mobile station 102 from a wireless network (e.g. from BTS 104). In an embodiment, the one or more criteria include a location of mobile station 102 being within a particular range of locations. In an embodiment, the one or more criteria include one or the other of (i) a location of mobile station 102 being less than a particular distance from some other location and (ii) the location of mobile station 102 being more than a particular distance from some other location. In an embodiment, that other location could represent a location of a base station (e.g. BTS 104).

In an embodiment, the one or more criteria include at least a given number of entries in mobile station 102's current MRU table being occupied by roaming networks. In an embodiment, the one or more criteria include at least a given number (such as 1 or 2) of entries at the top of mobile station 102's current MRU table being occupied by roaming networks. And clearly many other potential criteria could be used in given implementations.

In an embodiment, mobile station 102 receives from the wireless network (e.g. from BTS 104) a status-quo instruction to use its existing MRU table. In an embodiment, the MRU-override instruction that is carried out is a last-received MRU-override instruction. At step 308, mobile station 102 conducts at least one subsequent system acquisition with reference to the modified MRU table.

3. Conclusion

Various embodiments have been described above. Those skilled in the art will understand, however, that changes and modifications may be made to those examples without departing from the scope of the claims.

The invention claimed is:

1. A method comprising:
a mobile station maintaining a most-recently-used (MRU) table populated with data identifying one or more networks to which the mobile station was most recently connected, wherein the mobile station is arranged to conduct system acquisition by referencing the MRU table prior to referencing a preferred roaming list (PRL);
the mobile station receiving an MRU-override instruction from a wireless network;
the mobile station modifying its MRU table according to the MRU-override instruction, producing a modified MRU table, wherein the mobile station conditions modifying its MRU table according to the MRU-override instruction on one or more criteria being met, wherein the one or more criteria comprise one or the other of (i) a location of the mobile station being less than a particular distance from a location of a given landmark and (ii) the location of the mobile station being more than a particular distance from a location of a given landmark; and
the mobile station conducting at least one subsequent system acquisition with reference to the modified MRU table.

2. The method of claim 1, wherein the MRU-override instruction comprises content selected based on at least one of the location of the mobile station and a location of a base station.

3. The method of claim 1, wherein the MRU-override instruction comprises an MRU-override list of at least one network, wherein the mobile station modifying its MRU table according to the MRU-override instruction comprises the mobile station at least partially replacing its MRU table with at least part of the MRU-override list.

4. The method of claim 3, wherein the mobile station replaces a set number of entries in its MRU table with the at least part of the MRU-override list.

5. The method of claim 4, wherein the set number is 1 or 2.

6. The method of claim 4, wherein the entries are at the top of the MRU table.

7. The method of claim 3, wherein at least one of the content and order of the MRU-override list is determined based on a current roaming rate of at least one network.

8. The method of claim 1, wherein the mobile station modifying its MRU table according to the MRU-override instruction comprises the mobile station changing the order of its MRU table.

9. The method of claim 8, wherein changing comprises reversing.

10. The method of claim 1, wherein the mobile station modifying its MRU table according to the MRU-override instruction comprises the mobile station deleting one or more entries from the top of the MRU table list, and promoting lower entries.

11. The method of claim 1, wherein the MRU-override instruction does not include a list of one or more networks.

12. The method of claim 1, wherein the one or more criteria are included in the MRU-override instruction.

13. The method of claim 1, wherein the one or more criteria are received by the mobile station from a wireless network.

14. The method of claim 1, wherein the one or more criteria further comprise the location of the mobile station being within a particular longitude range and latitude range.

15. The method of claim 1, wherein the given landmark is a base station.

16. The method of claim 1, wherein the one or more criteria further comprise at least a given number of entries in the mobile station's current MRU table being occupied by roaming networks.

17. The method of claim 1, wherein the one or more criteria further comprise at least a given number of entries at the top of the mobile station's current MRU table being occupied by roaming networks.

18. The method of claim 17, wherein the given number is 1 or 2.

19. The method of claim 1, further comprising the mobile station receiving from the wireless network a status-quo instruction to use its existing MRU table.

20. The method of claim 1, wherein the MRU-override instruction is a last-received MRU-override instruction.

21. The method of claim 1, wherein the wireless network is arranged to periodically broadcast the MRU-override instruction in a coverage area.

22. The method of claim 1, wherein the wireless network is arranged to include the MRU-override instruction in a system parameters message.

23. A mobile station comprising:
a wireless-communication interface;

a processor; and data storage containing instructions executable by the processor for carrying out functions including:

maintaining a most-recently-used (MRU) table containing identifying data for one or more networks to which the mobile station was most recently connected, wherein the mobile station is arranged to start system acquisition with reference to the MRU table;

receiving an MRU-override instruction from a wireless network;

modifying its MRU table according to the MRU-override instruction, producing a modified MRU table, wherein the mobile station conditions modifying its MRU table according to the MRU-override instruction on one or more criteria being met, wherein the one or more criteria comprise one or the other of (i) a location of the mobile station being less than a particular distance from a location of a given landmark and (ii) the location of the mobile station being more than a particular distance from a location of a given landmark; and conducting at least one subsequent system acquisition with reference to the modified MRU table.

\* \* \* \* \*